United States Patent [19]

Tokunaga

[11] Patent Number: 4,485,156

[45] Date of Patent: Nov. 27, 1984

[54] PASTED TYPE LEAD-ACID BATTERY

[75] Inventor: Akio Tokunaga, Kyoto, Japan

[73] Assignee: Japan Storage Battery Company Limited, Kyoto, Japan

[21] Appl. No.: 599,916

[22] Filed: Apr. 13, 1984

[30] Foreign Application Priority Data

Oct. 19, 1983 [JP] Japan ................. 58-196589

[51] Int. Cl.$^3$ ............................. H01M 6/04
[52] U.S. Cl. .................... 429/204; 429/228
[58] Field of Search ................ 429/225–228, 429/204

[56] References Cited

U.S. PATENT DOCUMENTS 3,770,507 11/1973 Weissman et al. ............ 429/225 X
4,427,750 1/1984 Bilodeau et al. .............. 429/228 X Primary Examiner—Charles F. LeFevour
Attorney, Agent, or Firm—Sughrue, Mion, Zinn, Macpeak & Seas

[57] ABSTRACT

A pasted type lead-acid battery comprising positive plates plated with a paste material containing anisotropic graphite, the graphite having such characteristics that the spacing $d_{(002)}$ of (002) plane is given by $d_{(002)} \approx 3.35$ Å; the size $Lc_{(002)}$ of crystal in (002) plane is given by $Lc_{(002)} > 100$ Å; and the size $La_{(110)}$ of crystal in (110) plane is given by $La_{(110)} > 100$ Å, and that it has the diffraction line of (112) plane, is disclosed. The pasted type lead-acid battery of the invention is excellent in initial performance and good in cycling life performance.

5 Claims, 3 Drawing Figures

PASTED TYPE LEAD-ACID BATTERY

FIELD OF THE INVENTION

This invention relates to an improved pasted type lead-acid battery and in particular, to a lead-acid battery which is excellent in initial performance and good in cycling life performance.

BACKGROUND OF THE INVENTION

In general, the failure of lead-acid batteries is often caused by deterioration of positive plates thereof. As methods for improving the cycling life performance, there have been proposed a method for increasing the thickness and the paste density of the positive plate. However, the lead-acid batteries using such positive plates are poor in the initial performance, and if it is contemplated to secure the initial peformance by lowering the positive paste density, the life is likely shortened. Therefore, it was very difficult to obtain pasted type lead-acid batteries which are good in both the initial performance and the cycling life performance.

SUMMARY OF THE INVENTION

An object of the present invention is to improve the initial performance by adding anisotropic graphite to a positive plate having an enough thickness and a high paste density, while maintaining a good life performance which such positive plate originally possesses.

DETAILED DESCRIPTION OF THE INVENTION

Figure 1:
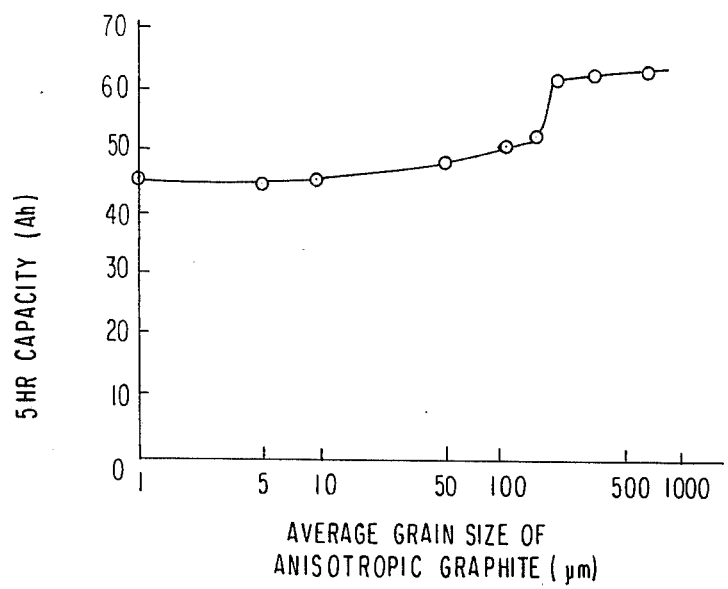
FIG. 1 shows a characteristic diagram of the relation between the average grain size of anisotropic graphite added and the discharge capacity.

In order to improve the initial performance, it has hitherto been proposed to add powdery or fibrous carbon or graphite relatively good in electtrical conductivity to a positive active material.

When this proposed method was applied to a positive plate having a high paste density, it was found that the initial performance was improved only to a slight extent. This is because in the positive plate having a high paste density, the porosity of the active material is poor, while the discharge performance of the positive plate is greatly dominated by the porosity, hence, a remarkable improvement of the initial performance cannot be expected even though carbon or graphite is added to the active material to increase the electrical conductivity.

The present invention utilizes such a characteristic that graphite having a high anisotropy in crystal expands in the direction of C axis of crystal upon anodic oxidation, and it has been found that even in a positive active material having a high paste density, the initial performance can be greatly improved by increasing the porosity.

Graphite is a layered substance where planes of hexagonal network structure of carbon atoms are stacked. While covalent bonds with strong bonding strength exist in the plane, the bond between the planes relies only upon a weak Van der Waals force. Accordingly, graphite will show the anisotropy (the physical property in the direction along the plane is different from that in the direction perpendicular to the plane). Further, various materials penetrate into spaced or gaps between the planes and graphite intercalation compounds are easily formed. A graphite bisulfate is one king of such graphite intercalation compounds and can be obtained by chemically oxidizing graphite in concentrated sulfuric acid, or anodically oxidizing graphite as given by the following equation.

In this case, it has been known that the interlayer spacing of 3.35 Å is expanded to an extent of 7.98 Å by the penetration of sulfuric acid.

Since expanding directions are not held constant in isotropic graphite or poorly crystalline graphite, the layered structure of such graphite is damaged as the graphite intercalation compound is formed, which results in collapsing. In contrast, highly anisotropic graphite having a grown layered structure expands only in a unified direction to form a stable graphite bisulfate. Therefore, if a positive plate prepared by adding graphite with high anisotropy to a positive active material is used, it can be expected to increase the porosity of the active material.

An object of the present invention is to provide a lead-acid battery which is excellent in both the initial and cycling life performances, based on the above finding on anisotropic graphite.

In the present invention, it is essential to use graphite where the layered structure is sufficiently grown and which is provided with the spacing of plane necessary for confining sulfuric acid as the intercalant. Such object of the present invention cannot be achieved using amorphous carbon or poorly crystalline graphite. The degree of growth of layered structure can be decided by subjecting the graphite material to X-ray diffraction. First, it is necessary that the spacing between the adjacent layers of graphite has a value close to $d_{(002)} = 3.35$ Å given in the case of pure graphite. The spacing can be determined by the angle of the diffraction line of (002) plane of graphite. If the graphitization is imperfect, the angle of diffraction in (002) plane may be shifted to lower angle, whereby the value of $d_{(002)}$ is increased. Then, it is required that the value Lc of stacked thickness of the layers is made high, and the value can be calculated by the half-value width of diffraction line of (002) plane according to the following equation.

$$Lc = k \cdot \lambda / (\beta \cos \theta) \qquad (1)$$

wherein k is a constant, $\lambda$ is a wavelength of X-rays, $\beta$ is a half-value width, and $\theta$ is an angle of diffraction.

Further, it is required in the same manner as described above that La, which is calculated by the formula (1) from the half-value width of the diffraction line of (110) plane and which indicates the layer diameter, has an area necessary for confining the intercalant within the spaces between layers. Still further, it is necessary that the diffraction line of (112) plane showing a three-dimensional regulation of graphite is observed. Finally, even if the properties of graphite described above are satisfied, the object of the present invention cannot be achieved when the grain size is small. In this case, the grain size referred to therein is an apparent grain size of graphite and is different from the size of crystal obtained by X-ray diffraction.

In the following embodiment, graphite or carbon materials A to D (each having a purity of above 98%) were employed, each of which is provided with the spacing $d_{(002)}$ of (002) plane, the size $Lc_{(002)}$ of (002) plane and the size $La_{(110)}$ of (110) plane, and the existence of diffraction line of (112) plane as shown in Table 1.

TABLE 1

| Material | $d_{(002)}$ (Å) | $Lc_{(002)}$ (Å) | $La_{(110)}$ (Å) | Existence of diffraction line of (112) plane |
|---|---|---|---|---|
| A | 3.35 | 760 | 1000< | Yes |
| B | 3.37 | 270 | 170 | Yes |
| C | 3.40 | 40 | 93 | Yes |
| D | 3.44 | 14 | 34 | No |

A and B are materials wherein the layered structure of graphite is well grown, and C is a material whose layered structure is not significantly grown. Further, D has turbostratic structure and cannot be called as graphite. These samples were passed through a screen such that the apparent grain size is in the range of from 200 to 1000μ. 1.0 wt% of each sample was added to a leady oxide together with 0.2 wt% of acid-resistant fibers such as polyester fibers having a length of 3 mm. Thus, a hard positive paste having a density of 4.6 g/cm$^3$ was prepared. Lead alloy grids, each having a thickness of 3 mm, were pasted with the respective paste materials. After curing, each positive plates were assembled with negative plates such that a glass mat-equipped separators were attached to the positive plates. The elements were inserted into a casing at a pressure of 25 kg/dm$^2$ to produce batteries having a nominal capacity of 50 Ah. Table 2 shows results in the case where the batteries were discharged at 5 hR at 30° C.

TABLE 2

| Battery No. | Graphite or carbon material added to positive paste | Porosity (%) | 1≃5 hR capacity (Ah) | Utilization of positive active material (%) |
|---|---|---|---|---|
| 1 | A | 56 | 60.5 | 36.0 |
| 2 | B | 54.8 | 57.1 | 33.9 |
| 3 | C | 51.0 | 50.5 | 30.0 |
| 4 | D | 51.0 | 46.3 | 27.6 |
| 5 | Nil | 48.5 | 44.4 | 26.4 |

It is clear from the results that A and B are effective to improve the initial capacity of the batteries (i.e., battery Nos. 1 and 2). The porosity of these positive active materials is 56% and 54.8%, respectively and is greatly increased as compared with that of the control battery No. 5 where no graphite or carbon material is added (i.e., 48.5%). The discharge performance of battery No. 3 using the graphite material C is slightly improved as compared with that of the control battery No. 5, but is not increased to that of graphite materials A and B. This is because a graphite intercalation compound is hardly formed since the layered structure of graphite is not significantly grown, and the porosity of the positive active material is not significantly increased. By the way, the measured result of the porosity was 51.0%. Further, when graphite remained in the positive plate after the charging was quantitatively measured, over 70% of initially added graphite was remained in the graphite materials A and B, whereas the residual amount of the graphite material C was only 10 to 20%, and carbon was not almost remained in the carbon material D.

As properties of graphite necessary to achieve the object of the present invention, it will be required that the spacing $d_{(002)}$ of (002) plane is close to 3.35 Å; the sizes $Lc_{(002)}$ and $La_{(110)}$ of crystal are above 100 Å; respectively (preferably $La_{(110)} > 1000$ Å); and that graphite has the diffraction line of (112) plane.

Figure 2:
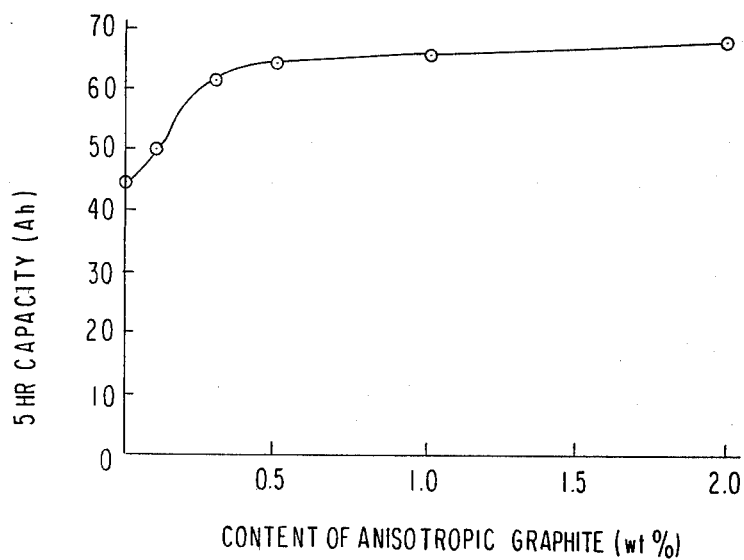
FIG. 2 shows a characteristic diagram of the relation between the amount of anisotropic graphite added and the discharge capacity.

On the graphite material A, the apparent grain size and the content added were varied to produce batteries in the same manner as described above, and the effect for 5 hR capacity was investigated. The test results were shown in FIGS. 1 and 2. FIG. 1 shows the results obtained in the case where the content was fixed to be 1 wt% and the average grain size of graphite A was varied from 1 μm to 650 μm. It was recognized that the discharge capacity is remarkably increased from about 200 μm. FIG. 2 shows the results obtained in the case where the content was varied using graphite having the average grain size of 340 μm. The increase of the capacity was remarkably effected even by the content of the order of 0.3 wt%, and the capacity was almost all constant in the content of above 1.0 wt%.

Figure 3:
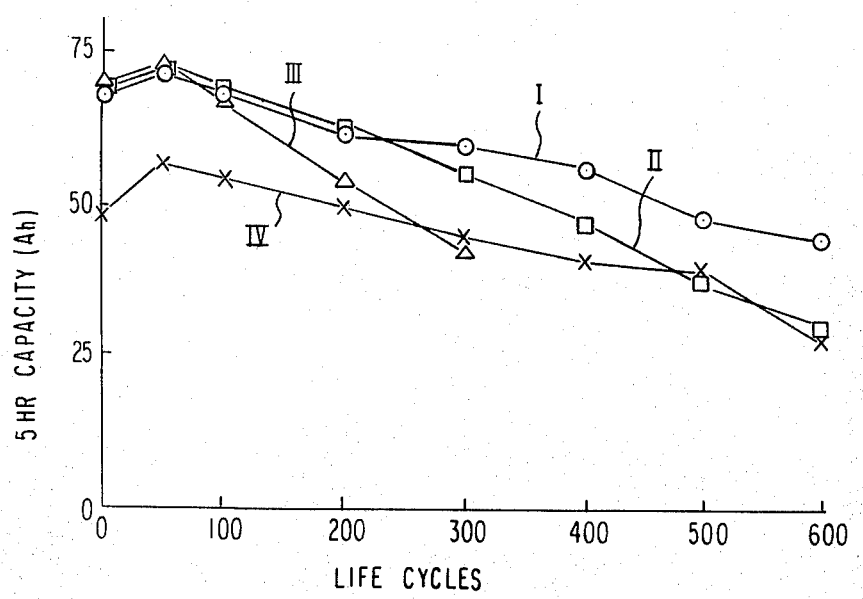
FIG. 3 shows a characteristic diagram of the comparison between the lead-acid batteries according to the present invention and conventional one in terms of the cycling life performance.

On a battery using a positive plate containing 1 wt% of graphite A with the grain size of 340 μm, a charge and discharge test (discharge: 12.5 A×3 h, charge: 9 A×5 h, temperature: 43° C.) was carried out and the results are shown in FIG. 3. In FIG. 3, I shows a battery which includes a positive plate containing 0.2 wt% of acid resistant fibers with a length of 3 mm together with the graphite and has a glass mat according to the present invention. A positive plate of II contains only the graphite and does not include acid resistant fibers. III shows a battery using the same positive plate as in I but the positive plate is not provided with the glass mat. IV shows a battery which uses a positive plate containing no graphite.

The battery I according to the present invention had the best capacity during the life test, and the capacity was lowered only to a slight extent. If the acid resistant fibers were not added, the life was slightly decreased. If the glass mat was not attached to the positive plate, the life was further reduced. The acid resistant fibers added to the positive plate and the glass mat attached to the positive plate are used to prevent the shedding due to deterioration of the positive active material caused by the charge and discharge. The battery IV containing no graphite had a lower capacity from the beginning.

As described in detail, in accordance with the present invention, the initial performance of battery can be greatly improved without decreasing the life performance of lead-acid batteries provided with positive plates containing the hard paste material. Thus, the present invention is quite valuable from the industrial standpoint.

Further, in the present invention it is necessary that graphite to be added has such properties defined clearly by the X-ray diffraction method. Natural or artificial graphite can be employed in the present invention if the properties are satisfied. In addition, the best performance can be obtained in cases that graphite having an average apparent grain size of about 200 μm is added in an amount of 0.3 to 2.0 wt%, preferably 0.5 to 1.0 wt%, to leady oxide together with acid resistant fibers and further that the glass mat is attached over the positive plate.

More further, the embodiment showed the case where the present invention was applied to the positive plate having the thickness of 3 mm pasted with the positive paste material having the density of 4.6 g/cm$^3$, but the improvement of the performance was greatly effected when particularly, the paste density was above 4.0 g/cm$^3$ and the thickness of the plate was above 2.0 mm, and even a soft paste material with a density of below 4.0 g/cm$^3$ had the effect of improving the initial performance.

Still further, as acid resistant fibers used in the present invention, sysnthetic fibers such as polyester, polyacrylonitrile, polypropylene, and the like and inorganic fibers such as glass fibers can be employed. These fibers can be cut out in the length of the order of 1 to 10 mm, and the cut fibers can be mixed with leady oxide. The content of the acid resistant fibers is preferably 0.1 to 0.5 wt%.

While the invention has been described in detail and with reference to specific embodiments thereof, it will be apparent to one skilled in the art that various changes and modifications can be made therein without departing from the spirit and scope thereof.

What is claimed is:

1. A pasted type lead-acid battery comprising positive plates pasted with a paste active lead oxide material containing anisotropic graphite, said graphite having such characteristics that the spacing $d_{(002)}$ of (002) plane is given by $d_{(002)} \approx 3.35$ Å; the size $Lc_{(002)}$ of crystal in (002) plane is given by $Lc_{(002)} > 100$ Å; and the size $La_{(110)}$ of crystal in (110) plane is given by $La_{(110)} > 100$ Å, and that it has the diffraction line of (112) plane.

2. A pasted type lead-acid battery according to claim 1, wherein the apparent grain size of said anisotropic graphite is above 200 μm.

3. A pasted type lead-acid battery according to claim 1, wherein the content of said anisotropic graphite is 0.3 to 2.0 wt% based on the weight of lead oxide.

4. A pasted type lead-acid battery according to claim 1, wherein said positive plate includes a paste material containing acid resistant fibers together with said anisotropic graphite.

5. A pasted type lead-acid battery according to claim 1, wherein glass mats are attached over both surfaces of said positive plates.

* * * * *